United States Patent Office 2,939,865
Patented June 7, 1960

2,939,865
PROCESS FOR REMOVING THE VOLATILE ORGANIC IMPURITIES FROM LACTAMS

Heinz R. Fueg, Domat-Ems, and Kurt Kahr, Chur, Switzerland, assignors to Inventa, A.-G., für Forschung und Patentverwertung Luzern, Lucerne, Switzerland No Drawing. Filed May 28, 1957, Ser. No. 662,006

6 Claims. (Cl. 260—239.3)

The present invention relates to a process for removing the volatile organic impurities from lactams.

As is known, for the manufacture of high-grade polyamides and for the products obtained therefrom, lactams of great purity must be used as raw material. However, the known methods of purifying crude lactams have not been successful in removing perfectly the volatile organic impurities adversely affecting the polymerization of the lactams. Also, these volatile organic impurities cause the lactams to turn yellow quickly when said lactams are stored in light. Furthermore, they impart to the lactams obtained through the Beckmann rearrangement of the oximes their characteristic odor. Through the processes of purification heretofore described, such as extraction and distillation, lactams have been obtained with slight quantities of volatile oxidizable impurities, but it has not been possible to remove perfectly even by repeated distillation, these small quantities which rather distil over in part with the pure lactams. It is known that when caprolactam is treated with inert gases in fused phase at approximately the boiling point of the caprolactam, a removal of oxidizable foreign substances is effected. Through this measure, however, no substantially better purification is accomplished than is accomplished through fractionated distillation, since comparatively a great deal of lactam distils over with the impurities, so that no quantitative separation of the volatile organic impurities is possible.

It has been found in accordance with the present invention that the volatile organic impurities from pre-purified lactams that are obtained through Beckmann rearrangement of alicyclic oximes with strong sulphuric acid and ensuing neutralization, can be removed by evaporation from the solid and anhydrous lactams.

According to the process of the present invention, traces of impurities that are present in large part in oily phase can be removed in simple manner by evaporation from the pre-purified, solid and anhydrous lactams, without the simultaneous distillation of any large-sized quantities of lactams.

The lactams lending themselves to purification according to this process would have to be freed thoroughly from the non-volatile impurities by extraction or distillation of the crude lactams. The lactams obtained and dehydrated by extraction can according to the process of the present invention be purified and then distilled. The solid lactams pre-purified by distillation can be subsequently purified in the form of flakes or powder by evaporation of the volatile impurities. In this way, the quality of the lactams is improved considerably, so that to all intents and purposes, oxidizable foreign substances can no longer be detected in the lactams. Furthermore, the characteristic odor resulting from the volatile organic impurities, for example, of technically pure caprolactam, is eliminated. The lactams purified in accordance with the present invention stand up perfectly under the influence of light.

The evaporation of the volatile impurities from the solid lactams is best carried out in such a way that, for example, finely divided lactams in the form of powder or flakes are brought to temperatures up to close to melting point in a heatable stirrer vessel with high vacuum and thorough intermixture. When this is done, the volatile impurities distil out from the anhydrous solid lactam. This evaporation can also be accomplished by passage of inert gases, without pressure or under decreased pressure. The heating can be done directly or indirectly, and when this is done, the inert gases used for the evaporation, such as nitrogen, air or carbon dioxide, can serve at the same time as heat transmitters. It is advisable for the attainment of a short duration of treatment to work at highest possible vacuum, since time and temperature depend for the purification to a great extent upon pressure.

The temperature required for the evaporation should be as high as possible, but it should nevertheless be under the melting point of the lactams. In purifying caprolactam, for example, it is advisable to work at 5–15° C. below melting point. The time of evaporation in this case comes to about 2 hours at 60° C. and 0.33 mm. of vacuum. In the case of a poorer vacuum or lower temperature, the time of purification is increased. Thus at 60° C. and 15 mm. Hg, about 20 hours is required. When use is made of inert gases, the lengths of time of purification are similar at like temperatures; when a large quantity of inert gas is blown through the solid and finely divided lactams the purification is accomplished in shorter time and with smaller quantity of gas in longer time.

The evaporation of the volatile organic impurities from the solid comminuted lactams can be carried out continuously, for example, by conducting the lactams in thin layer through an elongated vessel in a good vacuum while heating with infra-red rays. When use is made of inert gases, the continuous purification can be accomplished in similar manner, for example, with the aid of a continuous grate. The solidification of the molten lactams can also be carried out under vacuum and/or with the aid of inert gases in combination with the evaporation. After the evaporation of the volatile impurities, it is found that these subsequently treated lactams, solidified for example into flakes, have less tendency to cake.

The process according to the invention can be used generally for all other lactams, for example, valerolactam, oenanthlactam, octylic acid lactam, decylic acid lactam, undecylic acid lactam, etc., that are obtained from the corresponding oximes by Beckmann rearrangement with strong sulfuric acid and ensuing neutralization.

The lactams remaining behind after the evaporation of the impurities in the manner described, are of the greatest purity, heretofore unknown, and they satisfy the most rigid demands upon subsequent treatment to polyamides.

The following examples illustrate certain ways in which the principle of the invention has been applied, but they are not to be construed as limiting the broader aspects of the invention.

Example 1

3 parts by weight of a 90% aqueous extract of caprolactam that has been obtained by Beckmann rearrangement from cyclohexanonoxime, extracting the lactam with organic solvent and distilling off the latter in the presence of water, is dehydrated in vacuum and the residue is comminuted into powder. This powder is placed into a heatable stirrer vessel, the stirrer of which moves closely along the wall, and from said powder the volatile constituents are evaporated at a vacuum of 0.4 mm. Hg and a temperature of 57° C. for a period of about 3 hours. As residue, there remains behind a caprolactam that still contains only 5% of the impurities originally existing in traces. This product is once again subjected to a vacuum distillation, and there is obtained as distillate, practically without loss in caprolactam, a product of excellent and highest quality with a melting point of 69° C. The caprolactam obtained in this way has lost practically all of its odor and has great stability against the action of light.

In like manner also, caprolactam distilled and solidified into flakes can be purified.

Example 2

2 parts by weight of caprolactam distilled and solidified into flakes, that has been obtained by Beckmann rearrangement of the cyclohexanonoxime, is run through in a tower in about 12 hours with 3000 parts by volume of nitrogen with a temperature of 60° C. As a result of this purification, the caprolactam loses about 95% of its impurities originally present in traces and possesses the same good quality as in the preceding example.

In like manner air can be used instead of nitrogen.

Example 3

3 parts by weight of methyl-caprolactam distilled and powdered, which has been obtained from 2 methyl-cyclohexanonoxime by Beckmann rearrangement, is put into a stirrer vessel of the same kind as indicated in Example 1, for about two hours at a vacuum of 0.4 mm. Hg and a temperature of 75° C. while stirring, to cause the volatile impurities to be removed by evaporation. There remains behind a methyl-caprolactam of highest purity with a melting point of 91° C. and with practically no oxidizable impurities.

What is claimed is:

1. In the process for purifying lactams that have been obtained by Beckmann rearrangement of alicyclic oximes with strong sulphuric acid and ensuing neutralization, and that have been prepurified by removal of non-volatile impurities and water but that still contain small amounts of volatile organic impurities, the step which comprises removing the volatile organic impurities by evaporation from the solid lactam.

2. The process according to claim 1, characterized by the fact that as raw material, use is made of lactams that have been pre-purified by extraction with organic solvents.

3. The process according to claim 1, characterized by the fact that as raw or initial products, use is made of lactams that have been pre-purified by distillation.

4. The process according to claim 1, characterized by the fact that the evaporation is carried out in vacuum.

5. The process according to claim 1, characterized by the fact that the evaporation is carried out with the aid of inert gases.

6. The process according to claim 1, characterized by the fact that the process is carried out as a continuous operation.

References Cited in the file of this patent

UNITED STATES PATENTS

| | | |
|---|---|---|
| 2,221,369 | Cass | Nov. 12, 1940 |
| 2,297,520 | Wiest et al. | Sept. 20, 1942 |
| 2,313,026 | Schlack | Mar. 2, 1943 |

OTHER REFERENCES

Plimmer: Practical Org. and Biochemistry, pp. 13–14 (1915).

Plimmer: Practical Organic and Biochemistry, pp. 19–22 (1915), Longmans, Green and Co., New York.

Ser. No. 378,770, Drossbach et al. (A.P.C.), published April 20, 1943.